United States Patent
Greene, Sr. et al.

(10) Patent No.: US 6,681,113 B1
(45) Date of Patent: Jan. 20, 2004

(54) SYSTEM AND METHOD FOR REDIRECTING CALLS TO BLOCKED CELL SITES

(75) Inventors: Gregory A. Greene, Sr., Seffner, FL (US); William E. Hogg, Valrico, FL (US); Michael Nail, Lutz, FL (US); Leslie D. Servi, Lincoln, MA (US); Vance W. Stone, New Port Richey, FL (US)

(73) Assignees: GTE Wireless Incorporated, Alpharetta, GA (US); Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/409,555

(22) Filed: Sep. 30, 1999

(51) Int. Cl.[7] ................................. H04Q 7/20
(52) U.S. Cl. ................. 455/453; 455/443; 455/450
(58) Field of Search ................. 455/453, 443, 455/445, 450, 451, 452, 9, 10, 63, 442, 946, 409; 7/410, 62

(56) References Cited

U.S. PATENT DOCUMENTS

| | | | | |
|---|---|---|---|---|
| 4,670,899 A | * | 6/1987 | Brody et al. | 455/56 |
| 5,287,545 A | | 2/1994 | Kallin | 455/33.1 |
| 5,287,551 A | * | 2/1994 | Gustafson, Jr. et al. | 455/331 |
| 5,293,641 A | * | 3/1994 | Kallin et al. | 455/331 |
| 5,423,062 A | * | 6/1995 | Sakakura | 455/331 |
| 5,598,458 A | | 1/1997 | Bales et al. | 379/58 |
| 5,627,881 A | * | 5/1997 | Fletcher | 455/331 |
| 5,749,055 A | * | 5/1998 | Dahlin | 455/63 |
| 6,081,713 A | * | 6/2000 | Desgagne | 455/436 |
| 6,185,433 B1 | * | 2/2001 | Lele et al. | 455/528 |

* cited by examiner

Primary Examiner—Edward F. Urban
Assistant Examiner—Tilahun Gesesse
(74) Attorney, Agent, or Firm—Leonard Charles Suchyta; James K. Weixel

(57) ABSTRACT

A system reduces the number of blocked and abandoned calls in a wireless communication system. A cell site receives a call from a wireless station and determines that no available resources exist. In response thereto, the blocked cell site sends a retry message to the wireless station to redirect the call back to the originally blocking face of the cell site.

19 Claims, 5 Drawing Sheets

SYSTEM AND METHOD FOR REDIRECTING CALLS TO BLOCKED CELL SITES

FIELD OF THE INVENTION

The present invention relates generally to wireless communication systems and, more particularly, to a system and method for reducing blocking and abandonment of calls in a wireless communication system without increasing the number of channels employed.

BACKGROUND OF THE INVENTION

The cellular industry has made phenomenal strides in commercial operations both in the United States and the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

In addition to the challenges posed by the need for greater system capacity, the designers of future wireless communication systems have their own unique set of challenges. For example, one area of importance to system designers is to reduce the occurrence of call blocking (i.e., those instances when a call is attempted in a particular cell during a time when all channels in a cell are busy). Several attempts have been made to alleviate this problem. For example, one attempt is to simply signal to the calling party that all channels are busy (i.e., the calling party receives a busy signal). The busy signal tells the subscriber to attempt the call at a later time.

Another attempt is known as "directed retry." According to this conventional technique, when a cell site cannot handle a call from a wireless station (e.g., a cellular telephone or a mobile station) as a result of the site's channels being busy, the cell site sends the wireless station a list of possible neighboring cell sites to which the wireless station can attempt to establish a connection. This, in effect, redirects the call to a neighboring cell site that can handle the call.

FIG. 1 is a flow diagram of a method for establishing a call using a conventional directed retry message. In FIG. 1, a subscriber attempts to establish a call through the use of a wireless station in a cell site of a wireless communication system (step 110). To establish the call, the wireless station scans for the strongest control channel and attempts to tune to it. In response, the base station of the cell site determines whether there are adequate resources available to handle the call (step 120). If the cell site has channels available to handle the call, then the cell site assigns an available channel to the wireless station (step 130) to complete the call. If, on the other hand, the cell site has no channels available, then, according to the conventional directed retry technique, the cell site sends a directed retry message to the wireless station (step 140).

The conventional directed retry message includes two fields: a reorder field and a retry list field. The reorder field indicates to the wireless station that no channels are available at the cell site to handle the call. The retry list field includes a list of neighboring cell sites to which the wireless station can attempt to establish a connection.

After receiving the conventional directed retry message, the wireless station scans for the strongest control channel in the retry list and attempts to establish the call at the neighboring cell site (step 150), thereby repeating the above-described process in the neighboring cell site. Wireless stations generally include a time-out feature. As such, if a call is not completed after a predetermined period of time, the wireless station considers the call attempt to have failed and indicates this to the subscriber. The time-out period is typically 6 to 30 seconds.

While this conventional directed retry technique reduces congestion in the cell site in which the call originated, it also increases the overall interference of the cellular network. This increased interference arises in both analog and digital systems.

In analog systems, for example, it will be appreciated that an assignment of a wireless station in a first cell to a base station in a second cell may interfere with the frequency management plan of the cellular network. Analog cellular networks generally implement a frequency reuse scheme. By directing a wireless station in a first cell to a control channel in a neighboring cell, interference with this carefully planned frequency scheme results.

In digital systems, the increased interference arise from at least two factors: (1) that the wireless station may be assigned a traffic channel from a relatively distant base station; (2) that the wireless station sends its communication on the traffic channel with a relatively high power level. Both of these factors negatively influence signal-to-noise ratios in the cellular network.

Therefore, there exists a need for a system and method that reduces blocking and abandonment of calls in a wireless communication system without increasing the number of channels employed or disrupting the frequency management scheme of the wireless system.

SUMMARY OF THE INVENTION

Systems and methods consistent with the present invention address this need by providing a retry feature that increases the number of successfully completed calls in a wireless communication system without increasing the number of channels employed or disrupting the frequency management scheme of analog networks.

A method consistent with the present invention includes receiving a call from a wireless station (e.g., a cellular phone) at a blocked cell site. In response thereto, the blocked cell site sends a retry message to the wireless station. The retry message directs the wireless station to effectively redial the call to the same cell site. After a natural delay period, the wireless station attempts to establish the call at the blocked cell site for a second time. If the cell site remains blocked, the above-described process is repeated until either adequate resources become available to complete the call, the subscriber hangs up, or the wireless station times out.

By continuously directing the call back to the blocked cell site, a virtual queue is effectively created. Viewed another way, a retry message consistent with the present invention creates for the subscriber an automatic redial feature where a block call is automatically redialed.

In another implementation consistent with the present invention, a computer readable medium includes a message data structure. The message data structure includes a reorder field that indicates that resources are unavailable and a retry field that directs a wireless device to retransmit a call request to an antenna of a cell site that originally received the call request.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention seek to reduce call blocking and abandonment in a wireless communication network. To achieve this, a cell site sends a retry message to a wireless station when the wireless station's attempt to establish a call at the cell site fails due to blocking. The retry message directs the call back to the same face of the blocked cell site to which the call was originally directed. Directing the call back to the blocking cell site increases the number of successful completed calls and dramatically reduces disruption of the wireless network's frequency management scheme.

EXEMPLARY NETWORK

Figure 1:
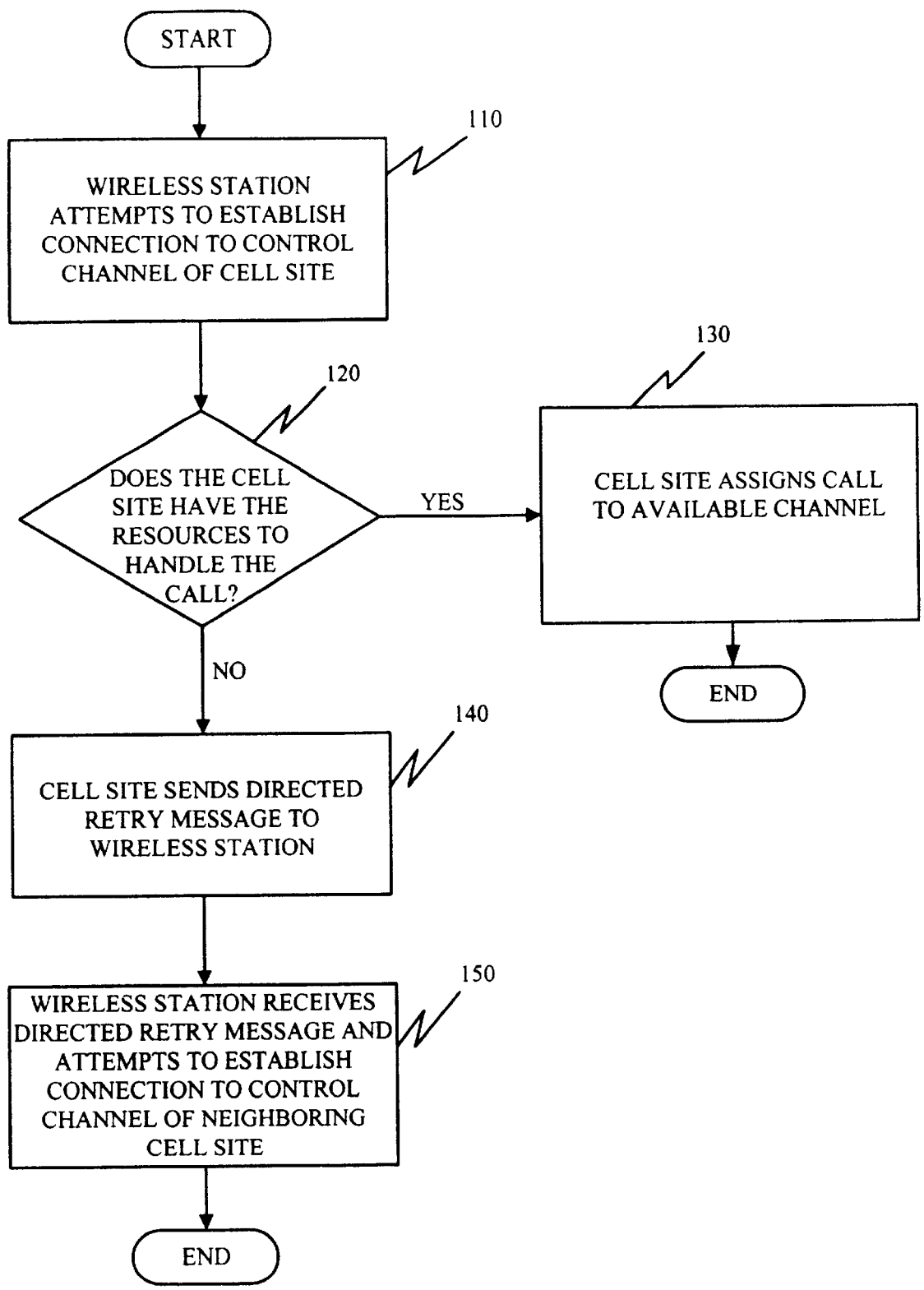
FIG. 1 illustrates a flow diagram of a method for establishing a call using a conventional directed retry message.
Figure 2:
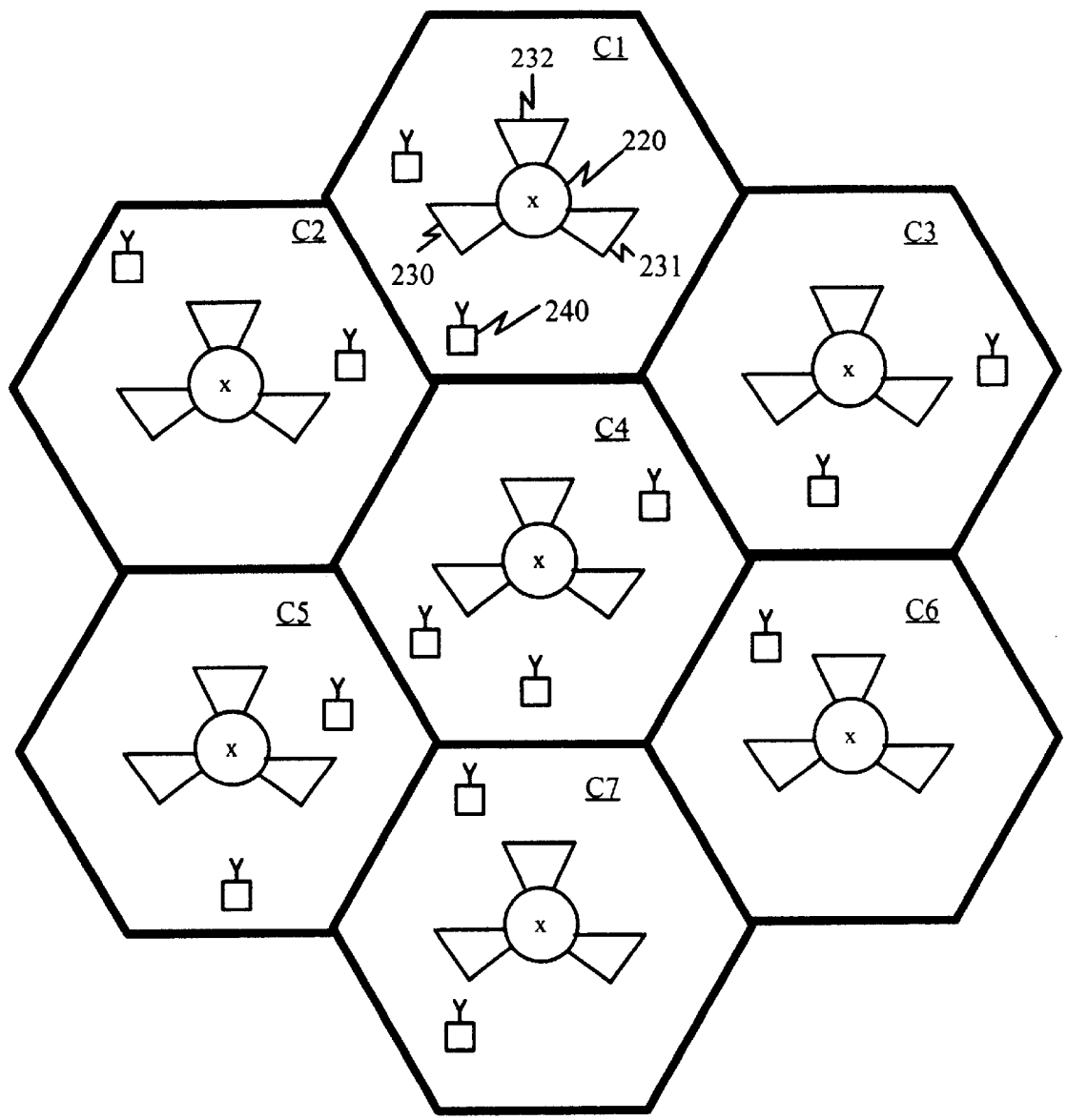
FIG. 2 illustrates an exemplary cellular network in which the retry feature consistent with the present invention may be implemented.

FIG. 2 illustrates an exemplary wireless communication network into which the call access system and method consistent with the present invention may be implemented. In FIG. 2, network 200 includes several contiguous wireless coverage areas, or cells, C1–C7. While the network shows only seven cells, the actual number of cells may be much larger or smaller in practice.

Figure 3:
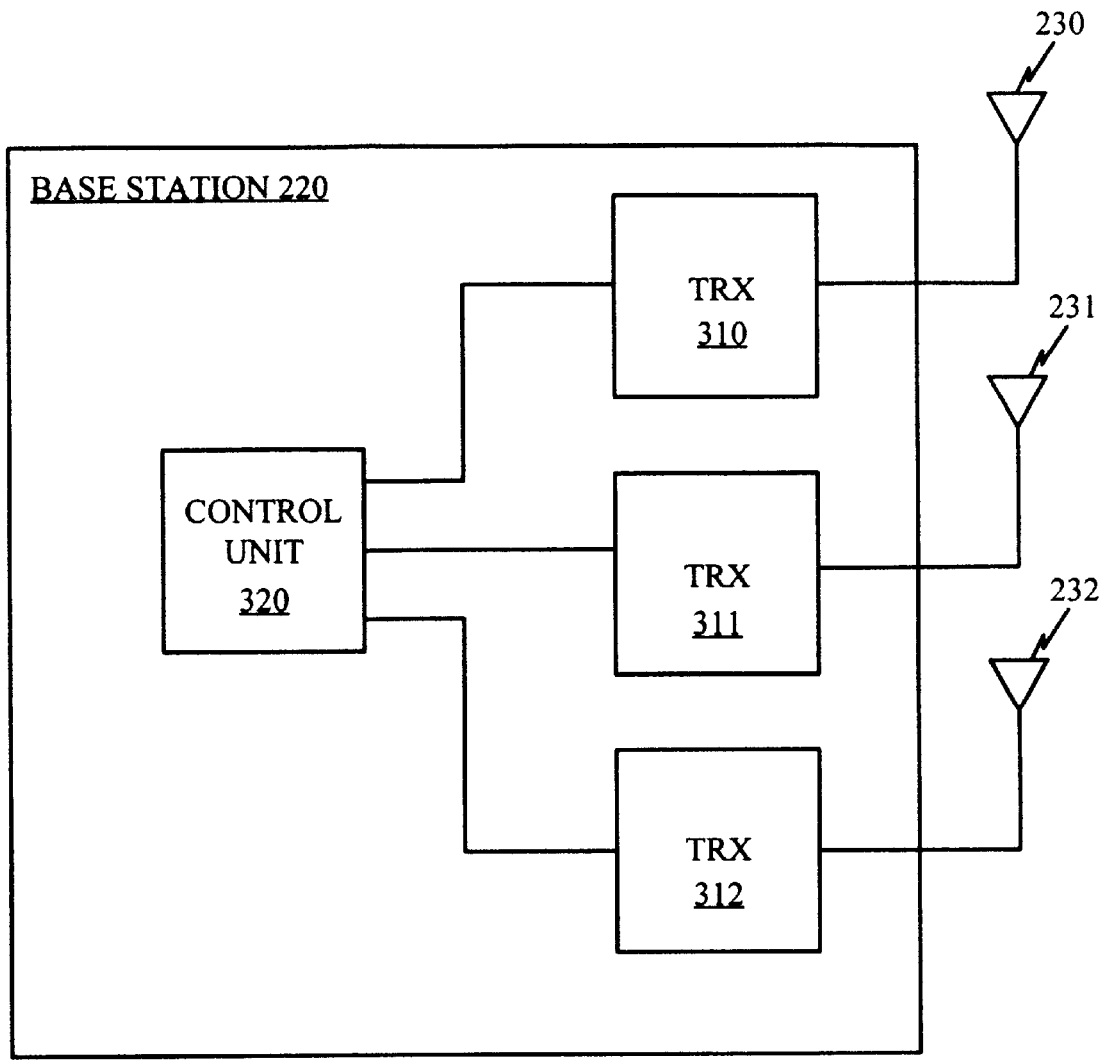
FIG. 3 illustrates an exemplary base station consistent with the present invention.

Each of the cells C1–C7 includes a base station 220, having three directional antennas 230–232, and may, at any given time, include one or more wireless stations 240. FIG. 3 illustrates an exemplary base station 220. The base station 220 includes three transceivers 310–312, three directional antennas 230–232 and a control unit 320.

The transceivers 310–312 may be any type of conventional transceiver. The transceivers 310–312 receive information from and transmit information to wireless stations 240 via the directional antennas 230–232, respectively. It will be appreciated that base station 220 may alternatively include dedicated transmitting and receiving units in place of transceivers 310–312.

The antennas 230–232 include conventional directional antennas for communicating with a wireless station. Each of the directional antennas 230–232 covers a 120 degree sector of the cell. Even though only three directional antennas have been shown, it will be appreciated that other cell configurations are possible. For example, the cells C1–C7 might alternatively include omni-directional antennas that transmit equally in all directions.

The control unit 320 includes a processor, or similar device, that controls the overall operation of the base station 220. The control unit 320 may also include some type of memory device for storing data.

Returning to FIG. 2, the wireless station 240 may be any type of wireless communication device, such as a cellular telephone. The actual number of wireless stations 240 found in a cell at any given time during operation of the network 200 may be much larger than shown in FIG. 2 and will generally exceed the number of base stations 220.

EXEMPLARY RETRY MESSAGE STRUCTURE

Figure 4:
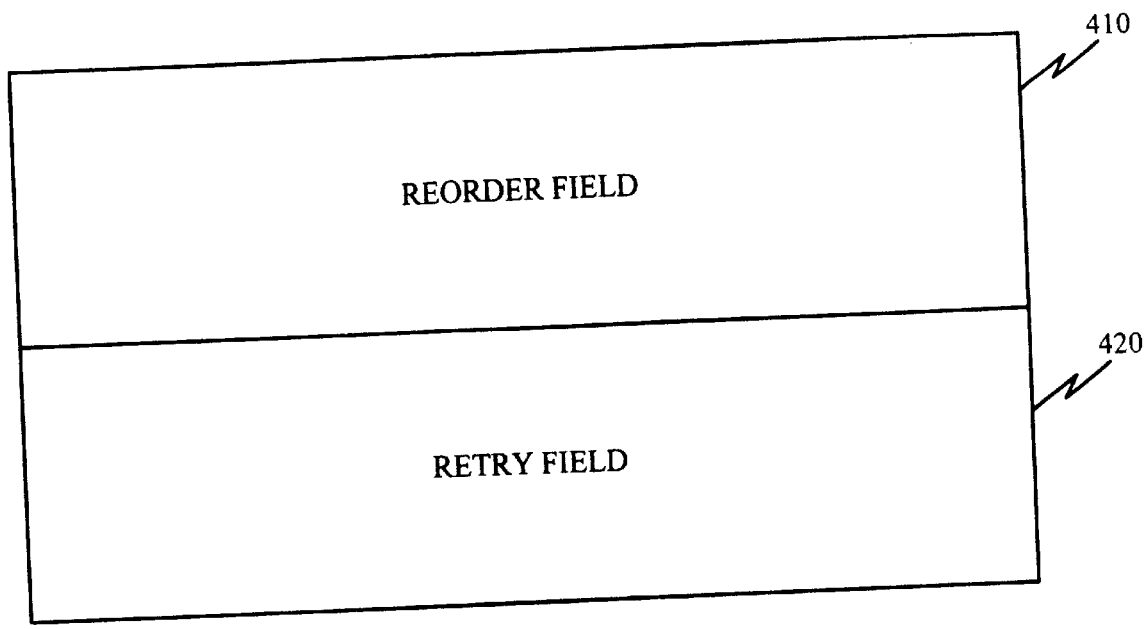
FIG. 4 illustrates an exemplary structure of a retry message consistent with the present invention.

FIG. 4 illustrates an exemplary structure of a retry message 400 consistent with the present invention. In FIG. 4, the exemplary retry message 400 includes a reorder field 410 and a retry field 420.

The reorder field 410 is similar to the reorder field of the conventional directed retry message. The reorder field 410 indicates to the wireless station that no channels are available to handle the requested call. The retry field 420, on the other hand, differs from that of the conventional directed retry message. While the retry list field of the conventional directed retry message contains a list of multiple neighboring cell sites to which the wireless station may direct the call, the retry field 420 consistent with the present invention includes a single location to which the call may be directed. The retry field 420 indicates to the wireless station that the call is to be directed back to the same face of the originally blocking cell site.

It will be appreciated that a retry message consistent with the present invention may include additional fields than those depicted in FIG. 4 that aid in the transmission, reception or processing of the message. For example, the retry message may also include error correction information.

EXEMPLARY NETWORK PROCESSING

Figure 5:
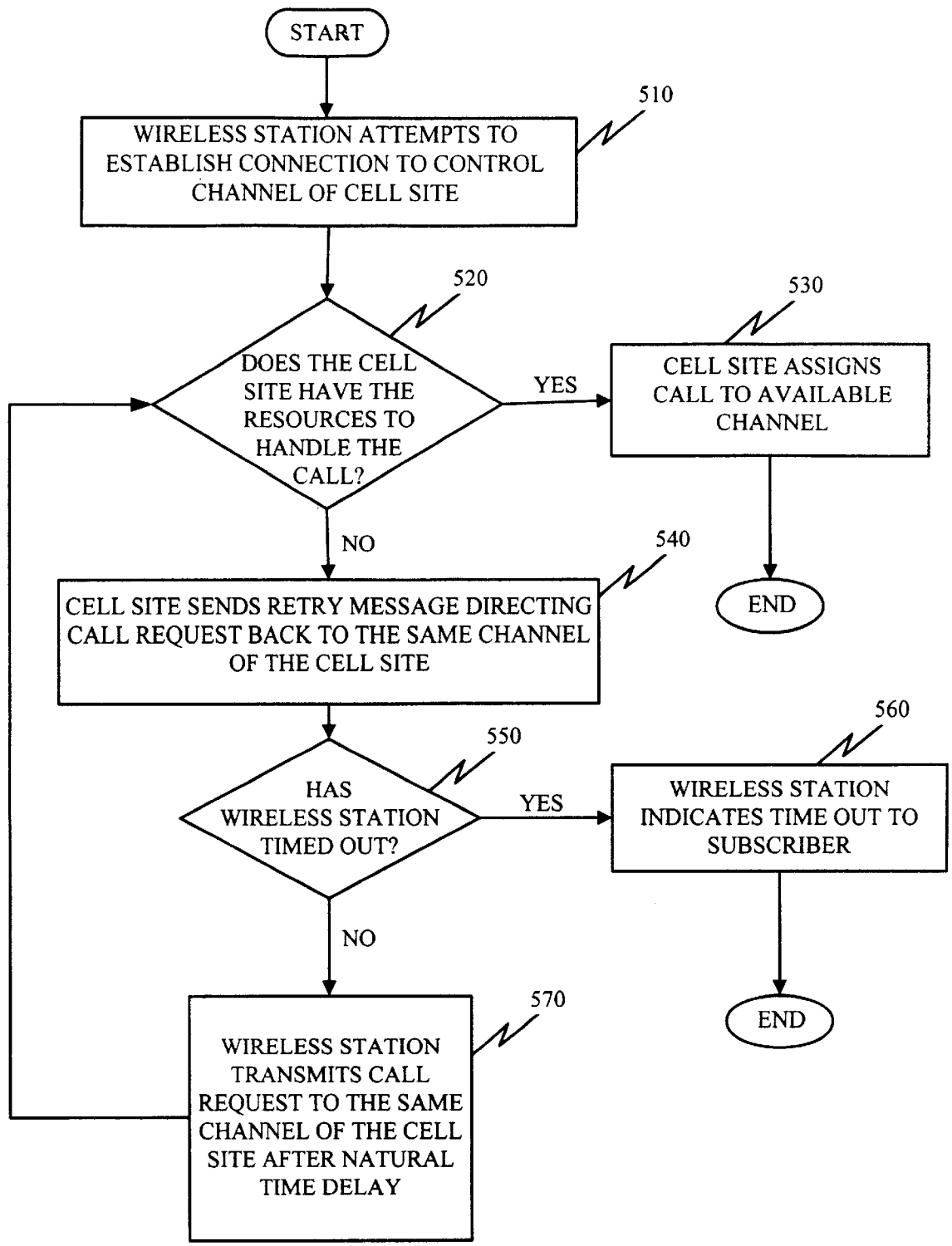
FIG. 5 illustrates a flow diagram of a method for establishing a call using a retry feature consistent with the present invention.

FIG. 5 illustrates a flow diagram of a method for establishing a call using a retry feature consistent with the present invention. In FIG. 5, a subscriber attempts to establish a call through the use of a wireless communication device, such as station 240, while in a cell (e.g., cell C1) of communication network 200 (step 510). To establish the call, the wireless station 240 scans for the strongest control channel and attempts to establish a connection thereto.

An antenna, such as antenna 230, receives the call and transfers the signal to base station 220. In response thereto, base station 220 determines whether there are adequate resources available to handle the call (step 520). If base station 220 determines that adequate resources are available, then it assigns a communication channel to the wireless station 240 (step 530). If, on the other hand, the cell site is blocked (i.e., the cell lacks the resources to handle the call), then base station 220 sends a retry message to the wireless station 240. The retry message includes a retry field 420 that directs the call back to the same antenna (face) 230 of the blocked cell site that originally received the call (step 540).

It is then determined whether the wireless station 240 has timed out (step 550). As set forth above, wireless stations generally have a time-out period between 6 and 30 seconds. If the wireless station 240 has timed out, then the subscriber will be provided with, for example, a busy signal (step 560). The subscriber may then try to place the call again.

If, on the other hand, the wireless station 240 has not timed out, then the wireless station 240 attempts once again to establish a connection to the same control channel of the cell site (step 570). When the redirected call arrives at the antenna 230, the base station 220 determines the availability of adequate resources to see if the call can be established. This process, in effect, redials the call without the subscriber's intervention and without running into interference problems that occur when directing a call elsewhere (e.g., to a neighboring cell).

The time for the wireless station 240 to receive the retry message and to attempt the call again is generally in the order of 2 seconds. Due to this natural delay, the chances of a subsequent call attempt being completed increases. This is due to the fact that the delay period provides an opportunity for a subscriber that is occupying a channel in the cell site to hang up thereby freeing up the channel for use by the wireless station.

Since wireless stations generally have a time-out period between 6 and 30 seconds, these stations can typically attempt to establish a call at least three times prior to the wireless station being timed out, thereby increasing the chances of a successful call.

By directing the call back to the originally blocking cell site, a retry technique consistent with the present invention, in essence, acts to queue call access attempts at the blocking cell site. As will be described hereinafter, the probability of completing the call increases as a result this retry technique.

Field tests have proven the effectiveness of a retry feature consistent with the present invention. The field tests measured the effects of a retry feature consistent with the present invention compared with the effects of using no directed retry feature at both normal and higher than normal blocking levels and at different regions of the country. The field tests proved that having the retry feature on was overwhelmingly beneficial in terms of lower blocking rates, higher success rates, and lower abandonment rates. Moreover, the average time for successful call completion increased. The field tests yielded the following advantages:

1) decreased probability of a new call being blocked by a factor of 16.3% (11.3% vs. 13.5%),
2) increased probability of being connected without any manual retries by a factor of 6.0% (91.7% vs. 86.5%),
3) increased probability of being connected within 25 seconds by a factor of 5.8% (93.4% vs. 88.3%),
4) increased probability of being connected by a factor of 3.0% (94.1% vs. 91.4%), and
5) decreased probability of call abandonment by a factor of 24.5% (4.0% vs. 5.3%).

As illustrated above, a retry feature consistent with the present invention provides significant benefits from a system designer's, as well as from a consumer's, point of view. From a system designer's point of view, 3.0% more successful call completions and fewer call abandonments result from the use of the retry feature consistent with the present invention, thus increasing minutes of use. From a consumer's point of view, more calls are completed immediately after the SEND key is pressed and more calls will be completed without the consumer having to manually redial, thus leading to an increase in consumer satisfaction.

CONCLUSION

Systems and methods consistent with the present invention provide a retry feature that increases the number of successfully completed calls in a wireless communication system without having to employ an increased number of channels. Directing blocked calls back to the same face of the cell site that originally received the call reduces call blocking and abandonment while dramatically reducing the disruption to the cellular network's frequency management scheme.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the following claims and their equivalents.

For example, while the retry feature of the present invention was described as being used in a wireless communication system, one skilled in the art will appreciate that a retry feature consistent with the present invention may also be used in wired communication systems.

What is claimed is:

1. A method for redirecting a call from a wireless station to a blocked cell site including a plurality of directional antennas, the method comprising:

receiving the call at one of the plurality of directional antennas of the blocked cell site; and sending a retry message to the wireless station to redirect the call to the one directional antenna.

2. The method of claim 1 wherein the retry message indicates a single location to redirect the call.

3. A system for directing a call from a wireless station to a blocked cell site including a plurality of directional antennas, the system comprising:

means for receiving the call at one of the plurality of directional antennas of the blocked cell site; and means for sending a retry message to the wireless station to redirect the call to the one directional antenna.

4. A method for handling a call from a wireless station to a cell site having unavailable resources for handling the call, the method comprising:

receiving a call access attempt at a directional antenna of the cell site; and sending, without considering a signal strength of the call access attempt, a retry message to the wireless station, the retry message directing the wireless station to resend the call access attempt to the directional antenna.

5. A system for use in a cell site in a communication network, the system comprising:

a directional antenna for receiving a call from a wireless station; and a transceiver for sending a retry message to the wireless station to redirect the call to the directional antenna when it is determined that adequate resources are unavailable to handle the call.

6. The system of claim 5 wherein the transceiver sends the retry message to the wireless station when it is determined that channels are unavailable to handle the call.

7. A wireless communication network comprising:

a wireless station for attempting to establish a call; and a cell site having a directional antenna for receiving the call attempt, determining whether adequate resources are available to handle the call, and sending a message to the wireless station, without considering a signal strength of the call attempt, to redirect the call to the cell site.

8. The wireless communication network of claim 7 wherein the cell site sends the message when channels are unavailable to handle the call.

9. A call access method in a wireless communication system having a plurality of cell sites each having a directional antenna, the method comprising:

sending a call request attempt from a wireless station to an antenna of a cell site;

determining at the cell site whether channels are available to handle the call request;

sending a retry message when channels are unavailable, the retry message indicating that the call is to be directed back to the antenna;

receiving the retry message at the wireless station; and repeating the sending a call request, determining, sending the retry message to at least one of the plurality of cell sites, and receiving for a predetermined period of time.

10. The method of claim 9 wherein the time period for receiving the retry message and sending a subsequent call attempt is approximately 2 seconds.

11. The method of claim 9 wherein the predetermined period of time is between 6 seconds and 30 seconds.

12. The method of claim 9 further comprising:

causing a busy tone to be produced by the wireless station when the predetermined period of time has been exceeded.

13. A system for completing a call in a wireless communication system, the system comprising:

a wireless station for sending a call establishment request; and a cell site having a directional antenna for receiving the call establishment request, determining whether adequate resources are available to handle the call, sending a message to the wireless station, based only on determining that adequate resources are unavailable, to redirect the call to the cell site, and completing the call when adequate resources become available.

14. The system of claim 13 wherein the cell site sends the message when channels are unavailable to handle the call.

15. A system for completing a call in a communication system, the system comprising:

a station for sending a call establishment request; and a site having a directional antenna for receiving the call establishment request, determining whether adequate resources are available to handle the call, queuing or virtually queuing the call establishment request based only on determining that adequate resources are unavailable, and completing the call when adequate resources become available.

16. A call access method in a communication system, the method comprising:

sending a call establishment request from a station to a fixed site having a directional antenna;

determining at the site whether resources are available to handle the call establishment request;

sending a retry message to the fixed site when resources are unavailable, the retry message indicating that the call is to be directed back to the site;

receiving the retry message at the station; and repeating the sending a call establishment request, determining, sending the retry message, and receiving for a predetermined period of time.

17. A method for completing a call in a communication system, the method comprising:

sending a call establishment request to a fixed site having a directional antenna;

determining whether adequate resources are available to handle the call establishment request;

queuing the call establishment request based only on determining that adequate resources are unavailable; and completing the call when adequate resources become available.

18. A computer-readable medium containing instructions for controlling at least one processor to perform a method comprising:

determining, in response to a call establishment request received at a cell site having a directional antenna, whether resources are available to handle the call request;

sending, based solely on determining that resources are unavailable, a retry message to redirect the call to the cell site having the directional antenna; and assigning a channel for the redirected call when resources become available.

19. A computer readable medium having a message data structure comprising:

a reorder field that indicates that resources are unavailable; and a retry field that directs a wireless device to retransmit a call request to a directional antenna of a cell site that originally received the call request.

* * * * *